(12) United States Patent  
Hennell et al.

(10) Patent No.: US 11,892,935 B2  
(45) Date of Patent: *Feb. 6, 2024

(54) VERIFICATION OF CONTROL COUPLING AND DATA COUPLING ANALYSIS IN SOFTWARE CODE

(71) Applicant: LDRA Technology, Inc., Atlanta, GA (US)

(72) Inventors: Ian Jon Hennell, Wirral (GB); James Adrian Hanson, Wirral (GB); Michael Peter Cieslar, Wirral (GB)

(73) Assignee: LDRA TECHNOLOGY, INC., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/967,130

(22) Filed: Oct. 17, 2022

(65) Prior Publication Data

US 2023/0048792 A1  Feb. 16, 2023

Related U.S. Application Data

(63) Continuation of application No. 17/734,354, filed on May 2, 2022, now Pat. No. 11,474,927.

(Continued)

(51) Int. Cl.
 *G06F 11/36* (2006.01)
 *G06F 8/75* (2018.01)
(52) U.S. Cl.
 CPC .......... *G06F 11/3604* (2013.01); *G06F 8/75* (2013.01); *G06F 11/3688* (2013.01)
(58) Field of Classification Search
 CPC ..... G06F 11/3604; G06F 8/75; G06F 11/3688

(Continued)

(56) References Cited

U.S. PATENT DOCUMENTS 5,699,507 A   12/1997  Goodnow et al.
7,284,274 B1  10/2007  Walls et al.
(Continued)

FOREIGN PATENT DOCUMENTS

CN   107703923 B    4/2020

OTHER PUBLICATIONS

RTT-DCC: Data & Control Coupling Analyser https://www.verified.de/products/rtt-dcc/, Verified Systems International GmbH, exact publication date unknow, retrieved on Apr. 28, 2022 (2 pages).

(Continued)

*Primary Examiner* — John Q Chavis
(74) *Attorney, Agent, or Firm* — Panitch Schwarze Belisario & Nadel LLP

(57) ABSTRACT

Methods and systems for verifying control coupling analysis in testing of software code include: selecting a source file to be tested, the source file having source code, the source file selected from a system set including a plurality of source files from one or more nodes in a system; identifying one or more control couples within the source file by performing static analysis on the source code of the source file; defining one or more test runs of the software code, the one or more test runs including one or more of the identified control couples, and the one or more test runs using dynamic analysis; executing the one or more defined test runs; identifying control coupling coverage of the source file based on the dynamic analysis; and generating a control coupling report based on the identified control coupling coverage of the source file.

24 Claims, 15 Drawing Sheets

Related U.S. Application Data

(60) Provisional application No. 63/196,935, filed on Jun. 4, 2021.

(58) Field of Classification Search
USPC .......................................................... 717/126
See application file for complete search history.

(56) References Cited

U.S. PATENT DOCUMENTS

| | | | |
|---|---|---|---|
| 7,299,458 | B2 | 11/2007 | Hammes |
| 7,900,193 | B1 | 3/2011 | Kolawa et al. |
| 9,230,099 | B1 | 1/2016 | McCorkendale et al. |
| 10,120,785 | B2 | 11/2018 | Meyers |
| 10,275,600 | B2 | 4/2019 | Wysopal et al. |
| 10,713,362 | B1 | 7/2020 | Vincent et al. |
| 11,474,927 | B1 * | 10/2022 | Hennell .............. G06F 11/3676 |
| 2011/0231936 | A1 | 9/2011 | Williams et al. |
| 2017/0212829 | A1 | 7/2017 | Bales et al. |
| 2018/0113796 | A1 | 4/2018 | Meyers |
| 2019/0278697 | A1 | 9/2019 | Sharma et al. |
| 2019/0377658 | A1 | 12/2019 | Chimdyalwar et al. |
| 2020/0183818 | A1 | 6/2020 | Guenther et al. |
| 2020/0364350 | A1 | 11/2020 | Wysopal et al. |
| 2021/0141914 | A1 | 5/2021 | Darke et al. |

OTHER PUBLICATIONS

Brochure LDRA "Introduction to Data Coupling and Control Coupling", Apr. 29, 2022 (72 pages).

Morton, Steve, "LDRA Tool Qualification Packs, a White Paper for the LDRA Tool Suite", LDRA Software Technology, pp. 1-6, vol. 2, exact publication date unknown, but at least as early as Jun. 2015, LDRA Ltd. (6 pages).

VectroCAST/Coupling "Data and Control Coupling Verification" and Satify DO-178C mandatory requirement for data coupling and control coupling analysis, cited on http://www.vector.com/int/en/products-a-z/software/wectorcast/#c193417, exact publication date unknown, retrieved on Apr. 28, 2022 (16 pages).

Notification of Transmittal of the International Search Report and the Written Opinion of the International Searching Authority, or the Declaration dated Aug. 12, 2022, in International Application No. PCT/US2022/027216, 12 pps.

* cited by examiner

VERIFICATION OF CONTROL COUPLING AND DATA COUPLING ANALYSIS IN SOFTWARE CODE

FIELD

The present disclosure relates to the verification of control coupling and data coupling analysis in software code. More specifically, the present disclosure relates to using static analysis and dynamic analysis in software testing to verify control coupling and data coupling analysis within software code.

BACKGROUND

In industries that utilize or otherwise depend on software, many of those industries have standards and/or objectives that define one or more requirements for that software to ensure the software operates in accordance with best practices for those industries. For example, an industry software standard or government regulations may advocate for the use of software testing such as, but not limited to, requirements-based test procedures and requirements-based traceability. The standard may also identify a need to verify the completeness of this software testing process such as through the use of structural coverage analysis. The purpose of such testing is to identify any structural coverage faults in the source code of the software being tested. Two such structural coverage faults may occur in control couples or data couples within the software code, which cannot adequately be detected using known coverage techniques such as Statement, Decision or Modified Condition/Decision Coverage (MC/DC). Thus, there is a need for techniques to verify that software testing adequately checks control coupling and data coupling analysis within software code.

SUMMARY

A method for verifying control coupling analysis in testing of software code is disclosed. The method includes selecting a source file to be tested, the source file having source code; identifying one or more control couples within the source file by performing static analysis on the source code of the source file; defining one or more test runs of the software code, the one or more test runs including one or more of the identified control couples, and the one or more test runs using dynamic analysis; executing the one or more defined test runs; identifying control coupling coverage of the source file based on the dynamic analysis; and generating a control coupling report based on the identified control coupling coverage of the source file.

A method for verifying data coupling analysis in testing of software code is disclosed. The method includes selecting a source file to be tested, the source file having one or more components; identifying one or more data couples within the source file by performing static analysis on the source code of the source file, the data couples being a variable and a parameter of the one or more components; defining one or more tests for each of the one or more components containing one or more of the identified data couples, the one or more tests using dynamic analysis; executing the one or more tests on the source file; identifying data coupling variable use coverage of the source file based on the dynamic analysis; and generating a data coupling report based on the identified data couple coverage.

A method for verifying control coupling and data coupling analysis in testing of software code is disclosed. The method includes selecting a source file to be tested, the source file having source code, the source code implementing one or more components; identifying one or more control couples within the source file by performing static analysis on the source code of the source file; defining one or more control couple test runs of the software code, the one or more control couple test runs including one or more of the identified control couples, and the one or more control couple test runs using dynamic analysis; executing the one or more defined control couple test runs; identifying control coupling coverage of the source file based on the dynamic analysis; identifying one or more data couples within the source file by performing static analysis on the source code of the source file, the data couples being a variable and a parameter of the one or more components; defining one or more data couple tests for each of the one or more components containing one or more of the identified data couples, the one or more data couple tests using dynamic analysis; executing the one or more data couple tests on the source file; identifying data coupling variable use coverage of the source file based on the dynamic analysis; and generating a report based on the identified control couple coverage and identified data coupling variable use coverage of the source file.

A system for verifying control coupling analysis in testing of software code is disclosed. The system includes one or more processors, one or more computer-readable memories, one or more computer-readable tangible storage devices, and instructions stored on at least one of the one or more storage devices for execution by at least one of the one or more processors via at least one of the one or more memories. The instructions include selecting a source file to be tested, the source file having source code; identifying one or more control couples within the source file by performing static analysis on the source code of the source file; defining one or more test runs of the software code, the one or more test runs including one or more of the identified control couples, and the one or more test runs using dynamic analysis; executing the one or more defined test runs; identifying control coupling coverage of the source file based on the dynamic analysis; and generating a control coupling report based on the identified control coupling coverage of the source file.

A system for verifying data coupling analysis in testing of software code is disclosed. The system includes one or more processors, one or more computer-readable memories, one or more computer-readable tangible storage devices, and instructions stored on at least one of the one or more storage devices for execution by at least one of the one or more processors via at least one of the one or more memories. The instructions include selecting a source file to be tested, the source file having one or more components; identifying one or more data couples within the source file by performing static analysis on the source code of the source file, the data couples being a variable and a parameter of the one or more components; defining one or more tests for each the one or more components containing one or more of the identified data couples, the one or more tests using dynamic analysis; executing the one or more tests on the source file; identifying data coupling variable use coverage of the source file based on the dynamic analysis; and generating a data coupling report based on the identified data coupling variable use coverage.

A system for verifying control coupling and data coupling analysis in testing of software code is disclosed. The system includes one or more processors, one or more computer-readable memories, one or more computer-readable tangible storage devices, and instructions stored on at least one of the one or more storage devices for execution by at least one of the one or more processors via at least one of the one or more memories. The instructions include selecting a source file to be tested, the source file having source code, the source code implementing one or more components; identifying one or more control couples within the source file by performing static analysis on the source code of the source file; defining one or more control couple test runs of the software code, the one or more control couple test runs including one or more of the identified control couples, and the one or more control couple test runs using dynamic analysis; executing the one or more defined control couple test runs; identifying control coupling coverage of the source file based on the dynamic analysis; identifying one or more data couples within the source file by performing static analysis on the source code of the source file, the data couples being a variable and a parameter of the one or more components; defining one or more data couple tests for each of the one or more components containing one or more of the identified data couples, the one or more data couple tests using dynamic analysis; executing the one or more data couple tests on the source file; identifying data coupling variable use coverage of the source file based on the dynamic analysis; and generating a report based on the identified control coupling coverage and identified data coupling variable use coverage of the source file.

BRIEF DESCRIPTION OF THE DRAWING FIGURES

The scope of the present disclosure is best understood from the following detailed description of exemplary embodiments when read in conjunction with the accompanying drawings. Included in the drawings are the following figures.

DETAILED DESCRIPTION

Glossary of Terms

Control Coupling—The manner or degree by which one software component influences the execution of another software component.

Data Coupling—The dependence of a software component on data not exclusively under the control of that software component. Data coupling is dependent on the structure of the control flow graph of either the complete system or, alternatively, of sub-systems.

Component—A self-contained part, combination of parts, subassemblies, or units that perform a distinct function of a system. In general, this term can include procedures, functions, subroutines, modules, Units of Conformance (UoC), and other similar programming constructs.

Figure 1A:
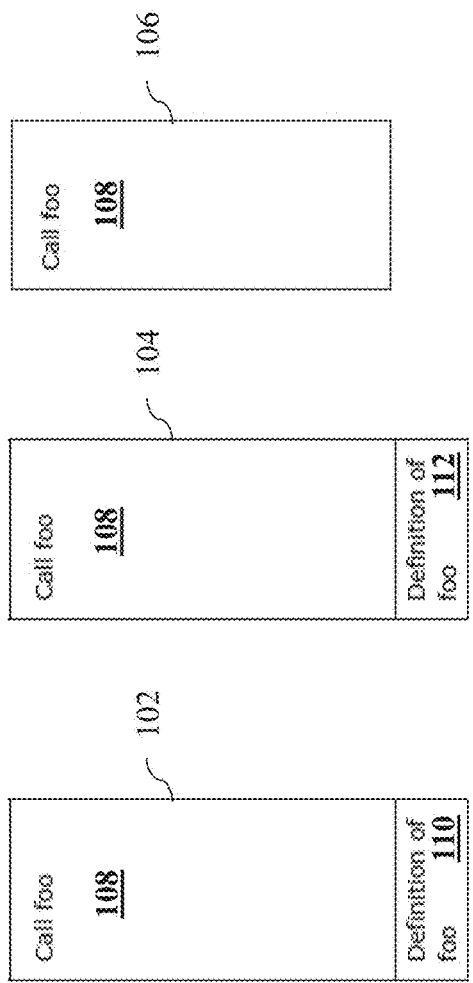
FIG. 1a is a block diagram illustrating an example control coupling in accordance with exemplary embodiments.

FIG. 1a illustrates an example of control coupling in accordance with exemplary embodiments. Three files 102, 104, and 106 each contain at least one call to a function foo 108. The file 102 contains a definition 110 of the function foo and file 104 contains a definition 112 of the function foo. The definitions 110,112 may be identical or possibly similar (e.g., same interface). A linker may choose to resolve all the calls to the definition 110 in file 102 (e.g., case 1) or it may resolve the calls in file 102 to definition 110 in the file 102, the call in file 104 to the definition 112 in the file 104 and the calls in file 106 may be resolved to either (e.g., case 2). This is an example of a control coupling defect because a user may be unaware of the ambiguity (i.e., which definition is a call to function foo 108 resolved to). The design of a system should be able to resolve which of these two linkage cases (e.g., case 1 vs. case 2) is required.

As another example, control coupling may be a parametric control coupling. A function foo which has a procedural parameter (i.e., it is possible to pass the name of another function through the parameter list of foo). A parametric control coupling can be illustrated as follows:

```
int var; int glob;
void foo ( void (*pfunc)(void) ) {
    if( var = = 1 ) {
        pfunc( ); /* case 1 */
    }
    else {
        pfunc( ) ; /* case 2 */
    }
}
int main ( void ) {
loop:
    get ( var ); get ( glob );
    if( glob == 1 ) {
        foo ( &func1 );
    } else {
        foo ( &func2 );
    }
    goto loop;
}
```

In this example the two data sets shown below will ensure that every statement is executed, and additionally every branch (or control flow decision).

| var | glob |
|---|---|
| 1 | 0 |
| 0 | 1 |

However, in the above example, there is potential that there are two functions which could have been called at the points labelled case 1 and case 2. With the two data sets provided above, only one function is called at each point, func2 at point case 1 and func1 at point case 2. Control coupling requires that all potential calls be executed at each point. To ensure that all of the control flow calls are executed, the requirements-based test data will therefore need to include two additional data sets. Clearly this concept can be applied to all cases of the use of pointers to functions. Where a function is called by pointer dereference, all the potential functions which could be called must be executed. Similarly, in C++, all virtual functions that can be called at a particular point must be executed by the requirements-based test data. To establish control coupling it is firstly essential that the set of possible functions to be called is known and secondly it must be known which members of this set are actually called. This information is normally proved by static analysis of the code under test.

Figure 1B:
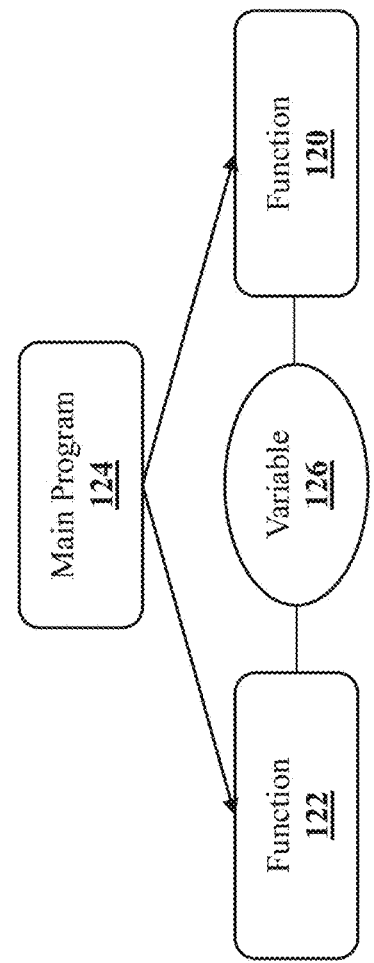
FIG. 1b is a block diagram illustrating an example data coupling in accordance with exemplary embodiments.

FIG. 1b illustrates an example data coupling defect in accordance with exemplary embodiments. The data coupling of FIG. 1b includes the function 120 and the function 122 both of which are called from the same main program 124 and which share the variable 126. The function 122 computes a value for the variable 126 (i.e., a set operation) whilst the function 120 outputs the value of the variable 126 to a display device (i.e., a use operation). The Main Program 124 may be illustrated as follows:

```
int main( ){
  int speed, order;
  loop:
    get( order);
    switch( order){
      case 1: calculate_airspeed(speed);
      case 2: display_airspeed(speed);
    }
    goto loop;
}
```

A first test case for the main program 124 may be constructed which executes the function 120 and then another test case which executes the function 122. In this case the control coupling is tested as required (i.e., every statement executed, and every branch/decision executed, with no MC/DC requirements in this case) but the ordering of the calls is defective because function 122 has no valid variable 126 to display. Similarly, if a test case calls function 120 and there is no subsequent call to the function 122 it is highly likely that there is another defect. Thus, the example of FIG. 1b illustrates that there is a need to demonstrate that all the inputs to a given function have valid values at the point of a call and that all values assigned to global variables are used. In this context a global variable is a variable declared and set externally to a function in which it is used. As another example, data coupling may include code in which a function foo has three uses a parametric variable "x":

```
int foo (int x ) {                    
  if ( x== 1 )                  // a use of x
    {return x ; }               // a use of x
  else
    {return x ; }               // a use of x }
```

This function may be called from the following main program:

```
int main( ) {
  int i, y, z ;
  for (i=1; i<=2; i++) {
    y = i;                      // y is set
    foo ( y ) ;                 // y is aliased to x
  }
  scanf ("%d", &z ); // z is set
  too ( z ); // z is aliased to x
  return 0;
}
```

In the above example, the first call to foo with argument y will cause every statement in foo to be executed and additionally every branch/decision because the loop generates both possibilities for y. It will also cause the execution of all three uses of y. The second call to foo with argument z does not cover any statements or branches/decisions in foo which are not already covered but it does introduce another three uses (of z) of which one is not executed. Data coupling based testing will require two test cases, one with z having a unit value and a second case with a different value so that all three uses of z in foo (via the alias x) are covered.

System Overview

Figure 2A:
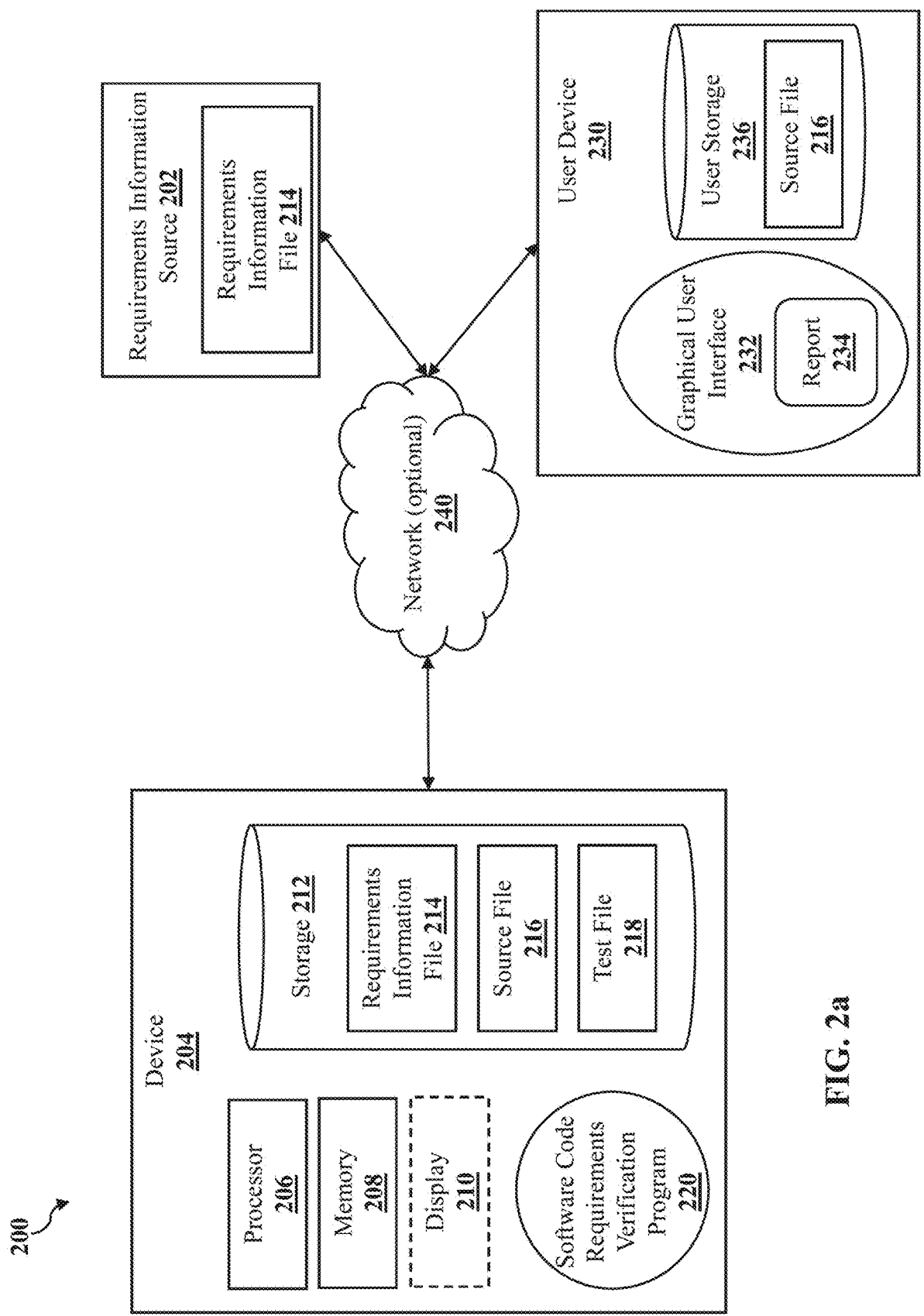
FIG. 2a is a block diagram illustrating a high level system architecture for verifying control coupling and data coupling analysis in software testing of software code in accordance with exemplary embodiments.

FIG. 2a illustrates system 200 for verifying control coupling and data coupling analysis in testing of software code in accordance with exemplary embodiments.

The requirements information source 202 may be a computing device, such as, but not limited to, a desktop computer, a notebook, a laptop computer, a tablet computer, a handheld device, a smart-phone, a thin client, or any other electronic device or computing system capable of storing, compiling, and organizing audio, visual, or textual data (e.g., the requirements information 214) and receiving and sending that data (e.g., the requirements information 214) to and from other computing devices, such as the device 204, and the user device 230. In such an embodiment, the requirements information 214 may be an electronic file such as, but not limited to, an MS Word document, a PDF file, a webpage, or any other suitable electronic file format, etc. In an embodiment, the requirements information source 202 may be a physical source such as, but not limited to a book, a paper, a pamphlet, or any other suitable physical source, etc. In an exemplary embodiment the requirements information file 214 be a software standard or software requirements that include, but are not limited to, control coupling and data coupling analysis standards/requirements in addition to any number of other software standards/requirements regarding the operation of the software. The requirements information file 214 may be for software in any industry such as, but not limited to, transportation, shipping, manufacturing, communication, finance, information services, consumer goods, retail, healthcare, real estate, utilities, energy, materials, and construction, etc. While only a single requirements information source 202 is illustrated, it can be appreciated that any number of requirements information sources 202 can be a part of the system 200.

The device 204 includes, for example, a processor 206, a memory 208, a display 210, a storage 212, and a software code requirements verification program 220. The device 204 may be a desktop computer, a notebook, a laptop computer, a tablet computer, a handheld device, a smart-phone, a thin client, or any other electronic device or computing system capable of storing, compiling, and organizing audio, visual, or textual data and receiving and sending that data to and from other computing devices, such as the requirements information source 202, and the user device 230. While only a single device 204 is illustrated, it can be appreciated that any number of devices 204 can be a part of the system 200.

The processor 206 may be a special purpose or a general purpose processor device specifically configured to perform the functions discussed herein. The processor 206 unit or device as discussed herein may be a single processor, a plurality of processors, or combinations thereof. Processor devices may have one or more processor "cores." In an exemplary embodiment, the processor 206 is configured to perform the functions associated with the modules of the software code requirements verification program 220 as discussed below with reference to FIGS. 3-8b.

The memory 208 can be a random access memory, read-only memory, or any other known memory configurations. Further, the memory 208 can include one or more additional memories including the storage 212 in some embodiments. The memory 208 and the one or more additional memories can be read from and/or written to in a well-known manner. In an embodiment, the memory and the one or more additional memories can be non-transitory computer readable recording media. Memory semiconductors (e.g., DRAMs, etc.) can be means for providing software to the computing device such as the software code requirements verification program 220. Computer programs, e.g., computer control logic, can be stored in the memory 208.

The display 210 can be any device capable of receiving display signals from a computing device, such as the device 204 and/or the user device 230, and outputting those display signals to a display unit such as, but not limited to, a LCD screen, plasma screen, LED screen, DLP screen, CRT screen, etc. While the display 210 is illustrated as part of the device 204, it can be appreciated that the display 210 can be a separate stand-alone display device or part of another computing device such as, but not limited to, the user device 230.

The storage 212 can include the requirements information file 214, a source file 216, and a test file 218. While only a single requirements information file 214, a single source file 216, and a single test file 218 are illustrated, it can be appreciated that any number of requirement information files 214, source files 216, and/or test files 218 may be stored in the storage 212. The storage 212 can be deployed on one or more nodes, e.g., storage or memory nodes, or more processing-capable nodes such as a server computer, desktop computer, notebook computer, laptop computer, tablet computer, handheld device, smart-phone, thin client, or any other electronic device or computing system capable of storing, compiling, and/or processing data and computer instructions, e.g., the requirements information 214, the source file 216, and the test file 218, and receiving and sending that data to and from other computing devices, such as the user device 230 and/or the requirements source 202. For example, the storage 212 is a collection of one or more requirements information files 214 received from one or more requirements information sources 202, one or more source files 216, and one or more test files 218 that can be accessed and utilized by the software code requirements verification program 220. The storage 212 can be any suitable storage configuration, such as, but not limited to a relational database, a structured query language (SQL) database, a distributed database, or an object database, etc. Suitable configurations and storage types will be apparent to persons having skill in the relevant art.

The requirements information file 214, as described above, may be received by the device 204 and stored in the storage 212 for use by the software code requirements verification program 220. The source file 216 may be any source file 216 containing source code for a software program. In an exemplary embodiment, the source file 216 has a corresponding requirements information file 214. For example, the source file 216 may be a lighting program for a tunnel system and the requirements information file 214 may be a software standard for such tunnel lighting systems. Further, the source file 216 may be a single source file 216 or a system set of source files 216. The source file 216 may be received by the device 204 directly (e.g. written on the device 204 or received via a drive of the device 204, etc.) and stored in the storage 212 for use by the software code requirements verification program 220 or the software code requirements verification program 220 may receive the source file 216 as user input via the graphical user interface 232. The test file 218 may be one or more test runs designed to test the source file 216. For example, the test file 218 may be a control coupling test or a data coupling test. A control coupling test file 218 may be a test defining variables, integers, or decisions to be made in a test run of the source file 216 designed to execute one or more control couples within the source code. A data coupling test file 218 may be a test defining variables, integers, or decisions to be made in a test run of the source file 216 designed to execute one or more data couples contained in one or more components of the source file 216. The source file 216 and the test file 218 will be discussed in more detail below with reference to FIGS. 3, 5, and 8a-8b. While only a single requirements information file 214, a single source file 216, and a single test file 218 are illustrated, it can be appreciated that any number of requirements information file 214, a single source file 216, and a single test file 218 may be stored in the storage 212.

The user device 230 includes a graphical user interface 232 and user storage 236. The user device may be a desktop computer, a notebook, a laptop computer, a tablet computer, a handheld device, a smart-phone, a thin client, or any other electronic device or computing system capable of storing, compiling, and organizing audio, visual, or textual data (e.g. the requirements information file 214, the source file 216, and/or the report 234, etc.) and receiving and sending that data to and from other computing devices, such as the requirements information source 202, and the device 204.

The graphical user interface 232 can include components used to receive input from the user device 230 and transmit the input to the software code requirements verification program 220, or conversely to receive information from the software code requirements verification program 220 and display the information on the user device 230. In an example embodiment, the graphical user interface 232 uses a combination of technologies and devices, such as device drivers, to provide a platform to enable users of the user device 230, and/or the device 204 to interact with the software code requirements verification program 220. In an embodiment, the graphical user interface 232 may be a web interface. In the example embodiment, the graphical user interface 232 receives input from a physical input device, such as a keyboard, mouse, touchpad, touchscreen, camera, microphone, etc. In an exemplary embodiment, the graphical user interface 232 may display a report 234. The report 234 may be a control coupling report, a data coupling report, a combination control coupling and data coupling report, a file call diagram, and/or a system call diagram. The report 234 may be generated for a single source file 216 or a system set of source files 216. The report 234 may be generated in any suitable format such as, but not limited to, HTML, ASCII text, and XLSX, etc. The software code requirements verification program 220 may receive the requirements information 214, the source file 216, and/or the test file 218 via the graphical user interface 232. While the graphical user interface 232 is illustrated as part of the user device 230, it can be appreciated that the graphical user interface 232 is a part of the software code requirements verification program 220 and may be a part of the device 204, and/or the requirements information source 202.

The user storage 236 may include the source file 216 as discussed above. The user storage 236 can be deployed on one or more nodes, e.g., storage or memory nodes, or more processing-capable nodes such as a server computer, desktop computer, notebook computer, laptop computer, tablet computer, handheld device, smart-phone, thin client, or any other electronic device or computing system capable of storing, compiling, and/or processing data and computer instructions (e.g., the source file 216) and receiving and sending that data to and from other computing devices, such as the device 204. For example, the user storage 236 is a collection of one or more source files 216 that can be accessed by or output to the software code requirements verification program 220 via the graphical user interface 232. The user storage 236 can be any suitable storage configuration, such as, but not limited to a relational database, a structured query language (SQL) database, a distributed database, or an object database, etc. Suitable configurations and storage types will be apparent to persons having skill in the relevant art. While the user storage 236 is illustrated as storing only the source file 216, it can be appreciated that the user storage may also store the requirements information file 214, and/or the test file 218. Further, while only a single user device 230 is illustrated, it can be appreciated that any number of user devices 230 can be a part of the system 200 and/or that the user device 230 and the device 204 can be the same device.

The network 240 may be any network suitable for performing the functions as disclosed herein and may include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art. In general, the network 240 can be any combinations of connections and protocols that will support communications among the requirements information source 202, the device 204, and the user device 230. In some embodiments, the network 240 may be optional based on the configuration of the requirements information source 202, the device 204, and the user device 230.

Figure 2B:
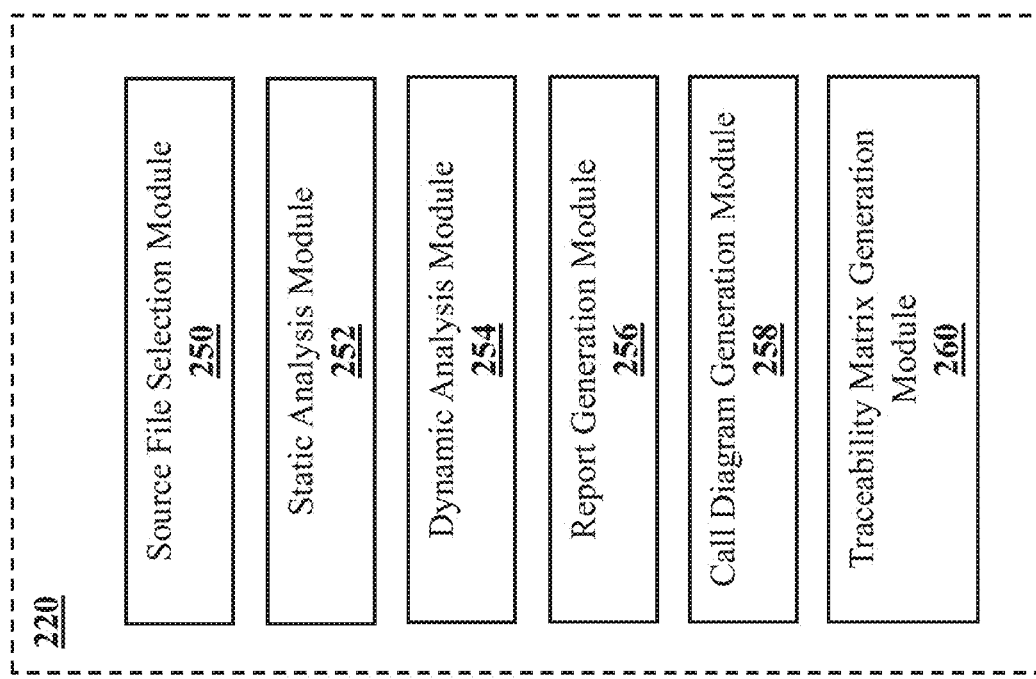
FIG. 2b is a block diagram illustrating example modules of the software code requirements verification program of FIG. 2a in accordance with exemplary embodiments.

FIG. 2b illustrates example modules of the software code requirements verification program 220 of FIG. 2a in accordance with exemplary embodiments.

The software code requirements verification program 220 can include source file selection module 250, static analysis module 252, dynamic analysis module 254, report generation module 256, call diagram generation module 258, and traceability matrix generation module 260. The software code requirements verification program 220 is a computer program specifically programmed to implement the methods and functions disclosed herein for verifying control coupling and data coupling analysis in testing of software code. The software code requirements verification program 220 and the modules 250-260 are discussed in more detail below with reference with FIGS. 3-8b. The software code requirements verification program 220 may also contain additional modules for verifying software requirements such as those discussed in U.S. Pat. No. 8,949,770 "Automated Management of Software Requirements Verification," herein incorporated by reference in its entirety.

Figure 3:
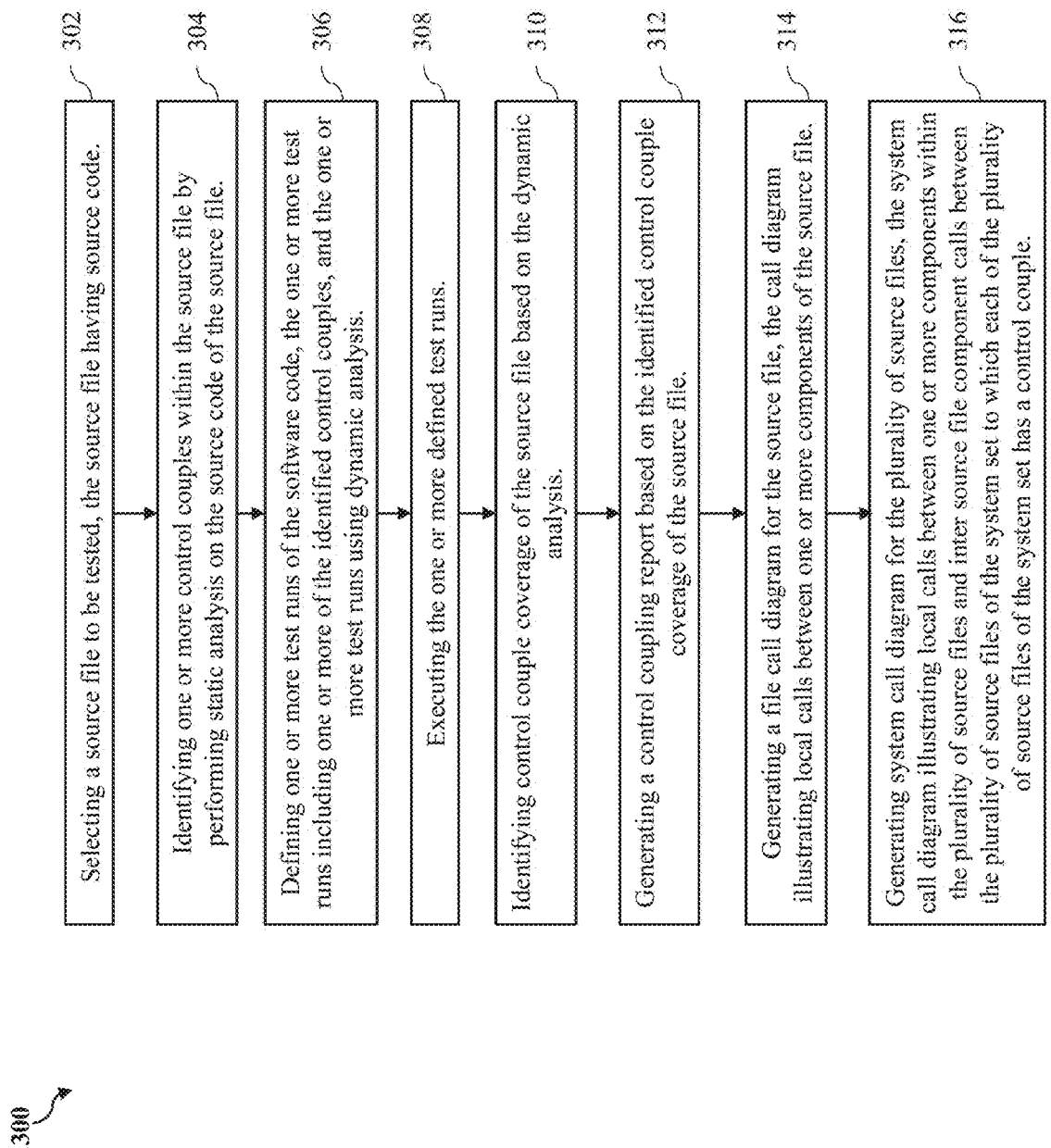
FIG. 3 is a flow chart illustrating an exemplary method for verifying control coupling analysis in testing of software code in accordance with exemplary embodiments.

Exemplary Method for Verifying Control Coupling Analysis in Testing of Software Code FIG. 3 is a flow chart illustrating an exemplary method 300 for verifying control coupling analysis in testing of software code in accordance with exemplary embodiments.

The method 300 can include block 302 of selecting a source file 216 to be tested, the source file having source code. The source file 216 may be selected from the storage 212 or it may be selected from the user storage 236 via the graphical user interface 232. The source file 216 can be a single source file or a system set including a plurality of source files 216 from one or more nodes in a system. For example, the source file 216 may be a computer program comprising one or more .c files or any other suitable type of source code file. The source file 216 may also be a test case file which is a human readable, text editable file which contains information within it which pertains to a particular file or set to be analyzed by the software requirements verification program 220. The source file 216 may be selected within the software requirements verification program 220 via the use of one or more drop down menus and/or one or more file folders. In an exemplary embodiment, the source file selection module 250 can be configured to execute the method of block 302.

The method 300 can include block 304 of identifying one or more control couples within the source file 216. Control couples can be identified by performing static analysis on the source code of the source file 216. Static analysis can be implemented to analyze source files 216, which have been written by software developers, to identify components in the source code and to assess compliance of the source code with the requirements information file 214. As referred to herein, a "component" can be a portion of source code written to implement a requirement of the requirements information file 214 in addition to the definition provided above. For example, components might include functions in the C programming language and classes and member functions in the C++ programming language. Static analysis may be performed using any known static analysis testing software or technology such as, but not limited to, LDRA Testbed™, etc. Further, static analysis can include, but is not limited to, main static analysis, complexity analysis, static data flow analysis, cross reference analysis, information flow analysis, data object analysis, MC/DC test case planner, and generate instrument programs, and/or any other suitable type of static analysis, etc. A user of the software requirements verification program 220 may initiate static analysis of the selected source file 216. For example, but not limited to, a user may click on an icon or make a selection from a menu to begin the static analysis of the selected source file 216. In an exemplary embodiment, the static analysis module 252 can be configured to execute the method of block 304.

The method 300 can include block 306 of defining one or more test runs of the software code. The one or more test runs of the source file 216 can include for example, but not limited to, requirements-based testing, accessibility testing, acceptance testing, block box testing, end-to-end testing, functional testing, interactive testing, integration testing, performance testing, security testing, stress testing, load testing, or any other software testing, etc. The one or more test runs can include one or more of the identified control couples. For example, a user may enter one or more integers, variables, or decision step responses as required by the source file 216 in order to test run the source file 216. For example, the source file 216 may be a cash register software program and the user may define integers such as, but not limited to: 's' which will start the source file 216, 'r' will perform a random shop and add multiple items to the basket (i.e. the test run), and 'q' will then quit the source file 216. These three options will use different parts of the software code of the source file 216 and implement calls to several functions within the software code under test. The one or more test runs may use dynamic analysis to test the coverage of the control couples within the source file 216. As referred to herein, dynamic analysis refers to the integration of static analysis, described above, and code coverage. In an exemplary embodiment, the dynamic analysis module 254 can be configured to execute the method of block 306. The one or more test runs may include less than all the identified control couples within the source file.

The method 300 can include block 308 of executing the one or more defined test runs. In an exemplary embodiment, the dynamic analysis module 254 can be configured to execute the method of block 308.

The method 300 can include block 310 of identifying control coupling coverage of the source file 216 based on the dynamic analysis. In an exemplary embodiment, the dynamic analysis module 254 can be configured to execute the method of block 310.

The method 300 can include block 312 of generating a control coupling report (e.g. the report 234) based on the identified control coupling coverage of the source file 216. The control coupling report may be transmitted to and displayed to the user via the display 210 and/or the graphical user interface 232 on the user device 230. In an exemplary embodiment, the report generation module 256 can be configured to execute the method of block 312.

Figure 4A:
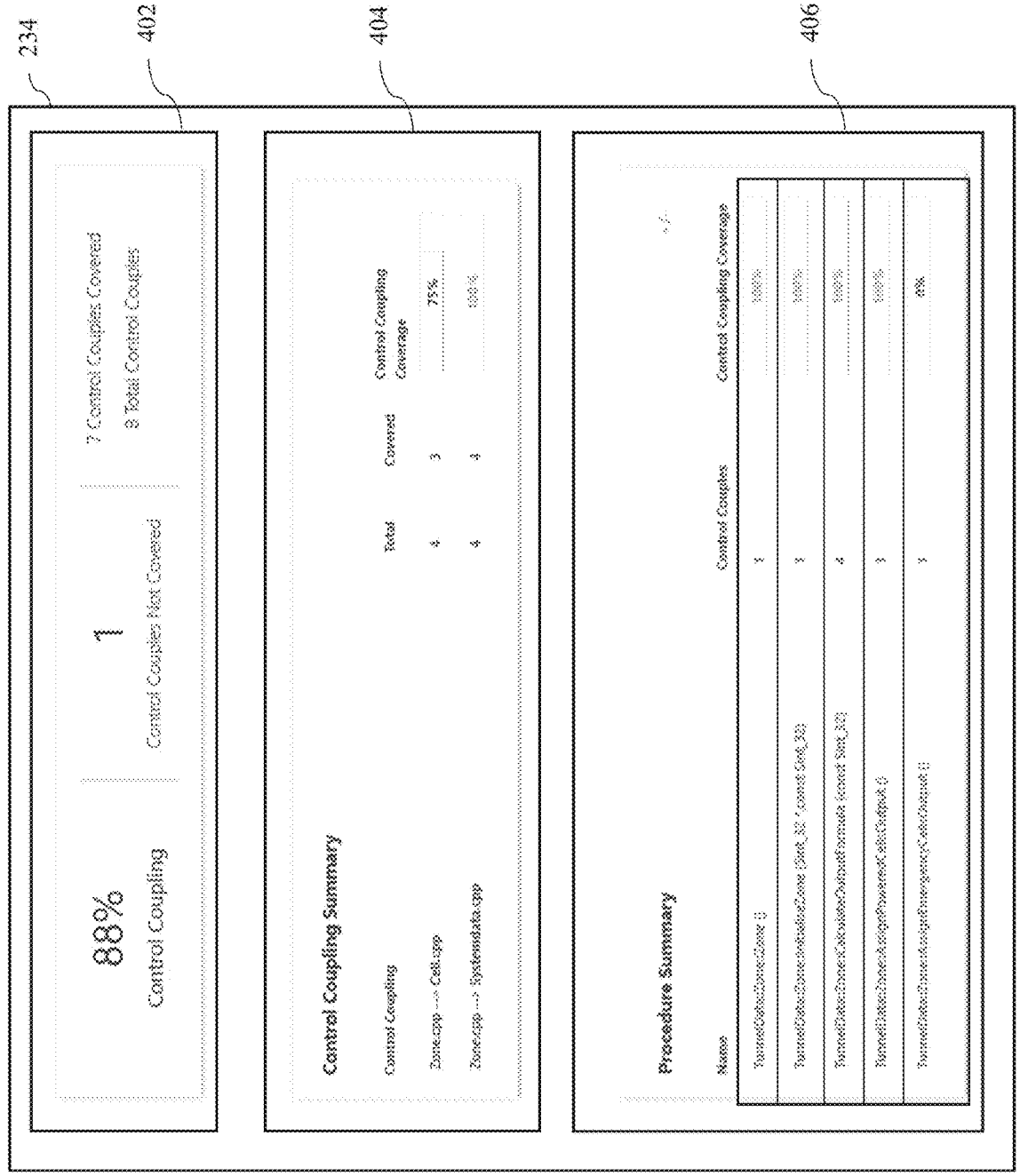
FIG. 4a-4b is a block diagram illustrating an example control coupling report in accordance with exemplary embodiments.
Figure 4B:
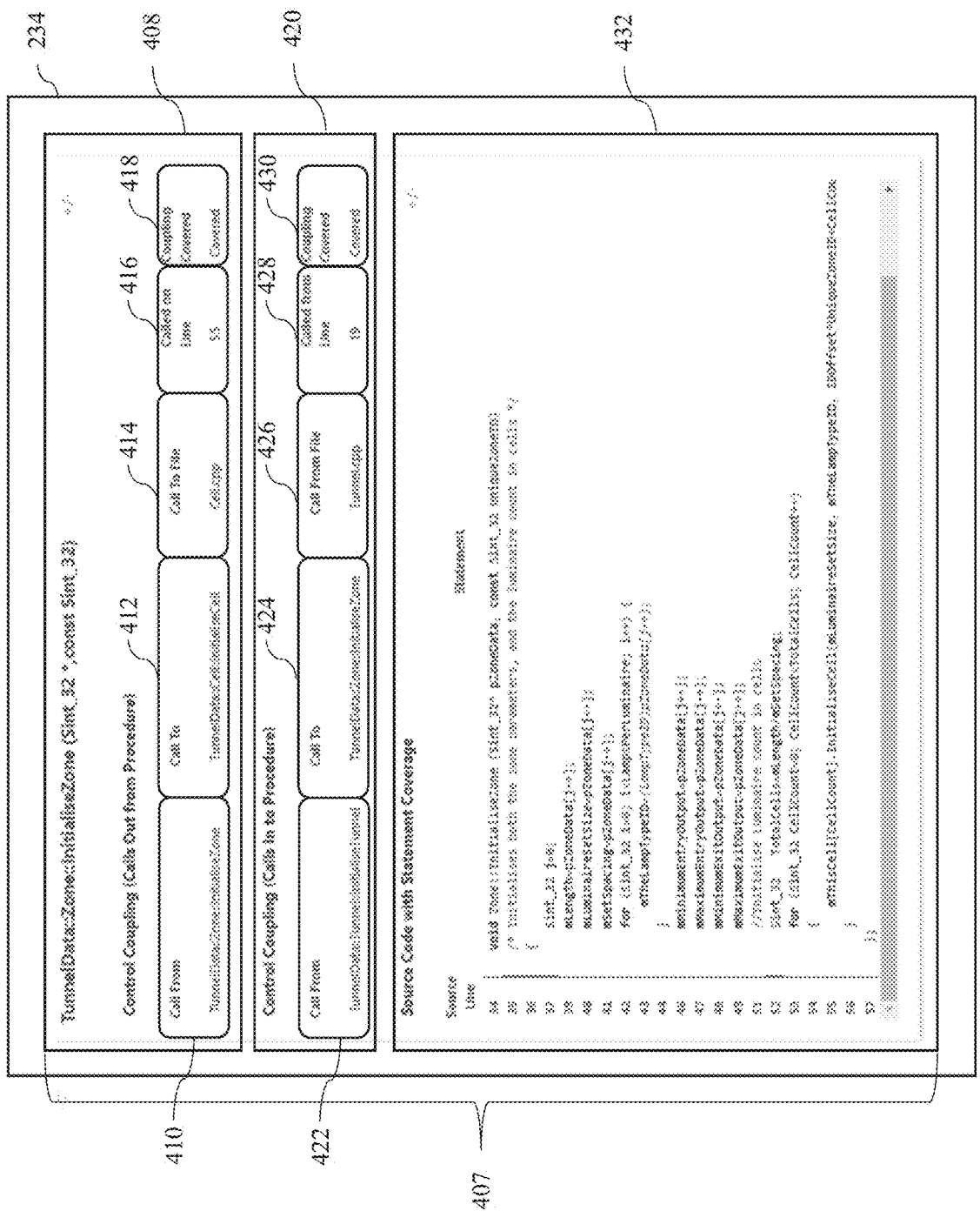

Referring to FIGS. 4a-4b, block diagrams illustrate an example control coupling report (e.g., the report 234) in accordance with exemplary embodiments. The control coupling report includes a first section 402, a second section 404, a third section 406, and a fourth section 407. The first section 402 is a high-level summary of control coupling information of the source file 216. The first section 402 indicates the control coupling coverage and the total number of identified control couples of the source file 216. The control coupling coverage can be displayed, for example, but not limited to, as a percentage between 0% and 100%. The second section 404 provides an overview of the destination of control couples that originate from the source file 216. The second section 404 can include an identification of one or more control couples within the source file 216, the destination location (e.g., components within the source file 216, other source files 216 within a system set of source files 216, and/or system sub-routines, etc.) of the identified one or more control couples from the source file 216, and a control coupling coverage based on the dynamic analysis for each identified one or more control couples. The third section 406 provides an overview of the control coupling coverage for the identified one or more control couples for each of one or more procedures or components within the source file 216. Each component line of the third section may be clickable or otherwise selectable via the software requirements verification program 220 (e.g. via the graphical user interface 232). If a user selects one of the component lines in the third section 406, the software requirements verification program may display the fourth section 407. The fourth section 407 includes a first table 408 and a second table 420. The first table 408 indicates the control couples of the one or more identified control couples that originate from each of the one or more components of the source file 216. The second table 420 indicates the control couples of the one or more identified control couples where the destination of the control couple is one of the one or more components of the source file 216. The fourth section 407 can also include source code section 432 that provides the source code of the source 216 file associated with the first table 408 and the second table 420. The first table 408 and the second table 420 include first columns 410, 422 identifying a call-from point between the one or more identified control couples, second columns 412, 424 identifying a call-to point between the one or more identified control couples, third columns 414, 426 indicating a destination source file 216 the call-to or call-from is to, fourth columns 416, 428 indicating a software code line of the source file 216 where each of the one or more identified control couples are located, and fifth columns 418, 430 indicating a control coupling coverage of the one or more identified control couples based on the dynamic analysis. The control coupling report may include a fourth section 407 for each of the one or more defined test runs.

Figure 4C:
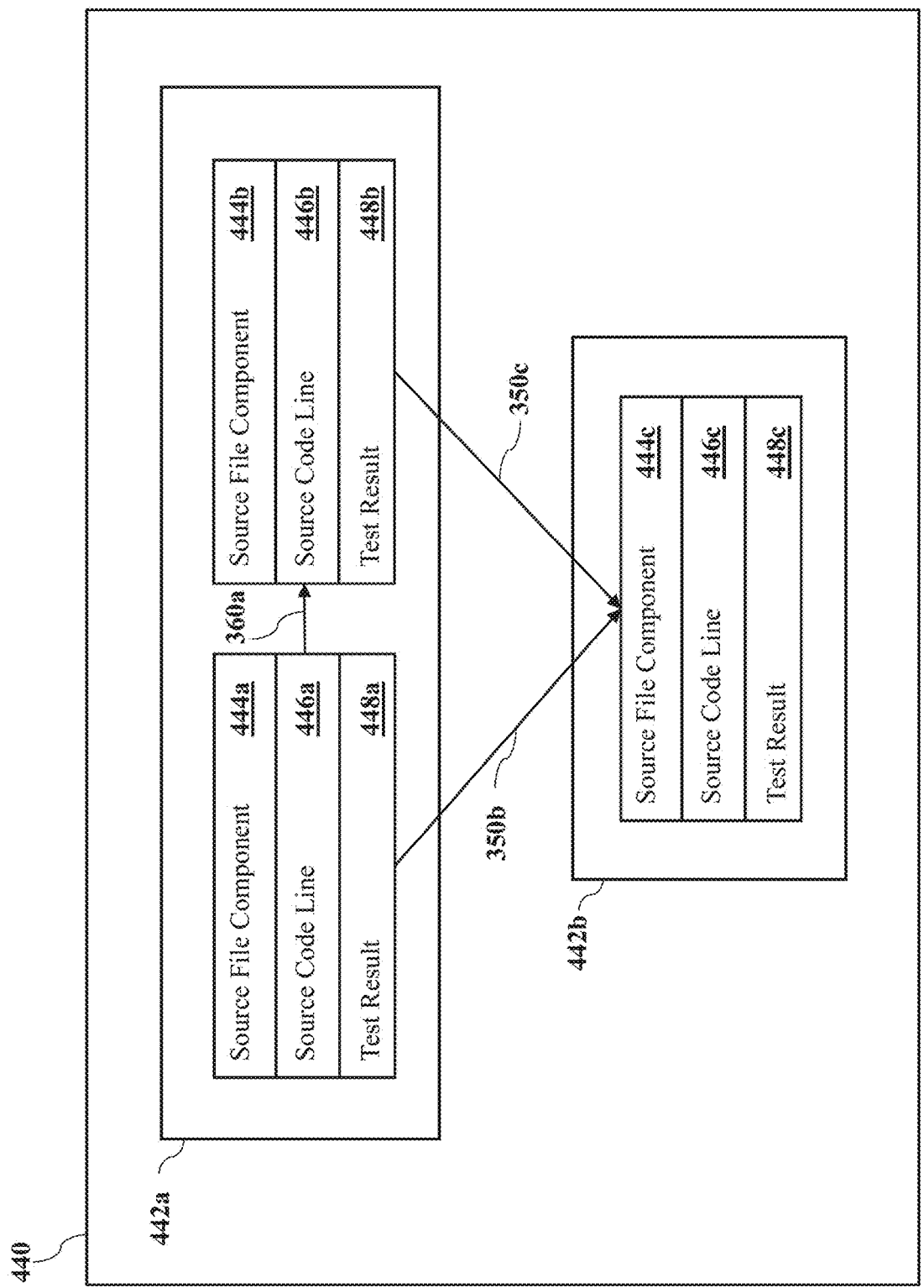
FIG. 4c is a block diagram illustrating a call diagram in accordance with exemplary embodiments.

Referring back to FIG. 3, the method 300 can include block 314 of generating a file call diagram 440 for the source file 216. FIG. 4c illustrates an example call diagram 440 in accordance with exemplary embodiments. The call diagram 440 may be a part of the report 234 or a standalone diagram. The call diagram 440 illustrates local calls between one or more components 444a-444c of the source file 216. In exemplary embodiments, the components 444a-444c of the call diagram 440 can include, but are not limited to, a source code line location 446a-446c of the components 444a-446c, and a test result indication 448a-448c. The test result indication 448a-448c can include, but is not limited to, a static analysis test result and the dynamic test result of the components 444a-444c, etc. The call diagram 440 may include lines and arrows 450a-450c to represent a call between one component, e.g. component 444a, of the source file 216 to another component, e.g. component 444b of the source file 216. The call diagram 440 may include calls within a single source file 216 or calls between a plurality of source files 216 (e.g. a system set of source files). The call diagram 440 may illustrate each node 442a-442b, which can be the computer device 204, the user device 230, or any other device of the system 200 the particular calls made to or from that node. The software requirements verification program 220 may enable a user to zoom in or zoom out on each node 442a-442b of the call diagram 440. For example, but not limited to, a user may scroll on a mouse wheel or laptop trackpad to zoom in or out of a particular section that the cursor is hovered over; invoke the context menu on the node you wish to view and choose 'Fit to Screen;' select the 'Zoom' button displayed on the graphical user interface 232; and/or use a cursor to then select the section of the call diagram 440 to enlarge or minimize, etc. The call diagram 440 can illustrate different graph types such as, but not limited to, a 'static' graph type or a static graph overlaid with dynamic analysis results. The graph type may be changed via the graphical user interface 232. In an exemplary embodiment, the call diagram generation module 258 can be configured to execute the method of block 314.

The method 300 can include block 316 of generating a system call diagram for a plurality of source files (e.g., a system set of source files). The system call diagram illustrates local calls between one or more components within the plurality of source files and inter source file component calls between the plurality of source files of the system set to which each of the plurality of source files of the system set has a control couple. Further, a user may select a single component of the one or more components within the plurality of source files generate a call diagram displaying the one or more nodes of the system involved in control coupling for the selected component. In an exemplary embodiment, the call diagram generation module 258 can be configured to execute the method of block 316.

Figure 5:
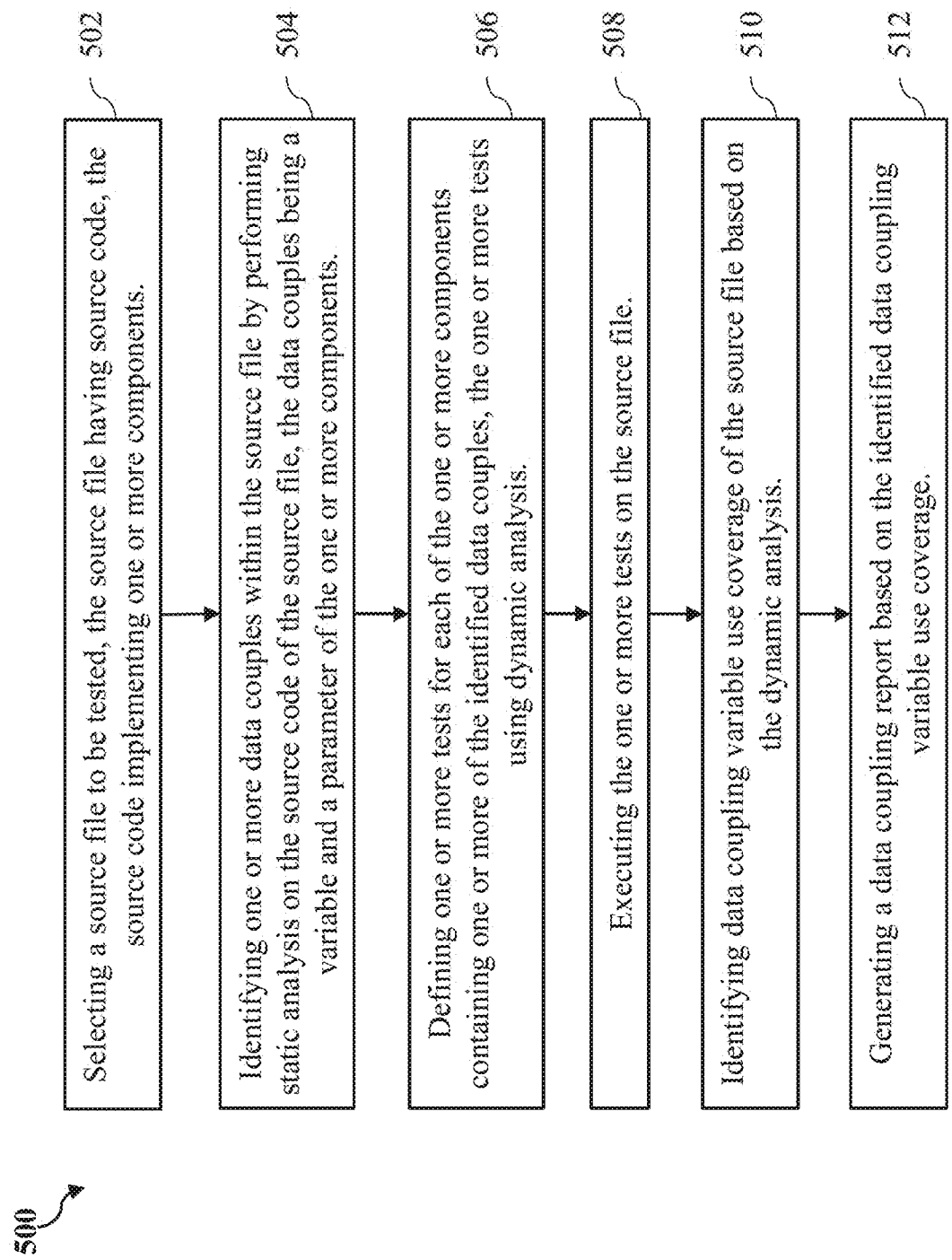
FIG. 5 is a flow chart illustrating an exemplary method for verifying data coupling analysis in testing of software code in accordance with exemplary embodiments.

Exemplary Method for Verifying Data Coupling Analysis in Testing of Software Code FIG. 5 is a flow chart illustrating an exemplary method for verifying data coupling analysis in testing of software code in accordance with exemplary embodiments.

The method 500 can include block 502 of selecting a source file 216 to be tested. The selected source file 216 may include one or more components. The source file 216 may be selected from the storage 212 or it may be selected from the user storage 236 via the graphical user interface 232. The source file 216 can be a single source file or a system set including a plurality of source files 216 from one or more nodes in a system. For example, the source file 216 may be a computer program comprising one or more .c files or any other suitable type of source code file. The source file 216 may also be a test case file which is a human readable, text editable file which contains information within it which pertains to a particular file or set to be analyzed by the software requirements verification program 220. The source file may be selected within the software requirements verification program 220 via the use of one or more drop down menus and/or one or more file folders. In an exemplary embodiment, the source file selection module 250 can be configured to execute the method of block 502.

The method 500 can include block 504 of identifying one or more data couples within the source file 216. The data couples may be identified by performing static analysis on the source code of the source file 216. Static analysis can be implemented to analyze source files 216, which have been written by software developers, to identify components in the source code and to assess compliance of the source code with the requirements information file 214. As referred to herein, a "component" can be a portion of source code written to implement a requirement of the requirements information file 214 in addition to the definition provided above. For example, components might include functions in the C programming language and classes and member functions in the C++ programming language. Static analysis may be performed using any known static analysis testing software or technology such as, but not limited to, LDRA Testbed™. Further, static analysis can include, but is not limited to, main static analysis, complexity analysis, static data flow analysis, cross reference analysis, information flow analysis, data object analysis, MC/DC test case planner, and generate instrument programs, and/or any other suitable type of static analysis, etc. The one or more data couples may be a variable and a parameter of the one or more components of the source file 216. The variable may also have a variable type and/or a variable attribute. Variable types include, but are not limited to, a constant variable, a local variable, a global variable, a parameter variable, and/or a local-global variable, etc. Variable attributes include, but are not limited to, declaration, definition, reference, input, output, indirect usage, unused parameter, used at the C++ "this" parameter, etc. The one or more data couples can also include data couples arising from parameter couples associated with call-into and call-out-of components of the source file 216. In an exemplary embodiment, the static analysis module 252 can be configured to execute the method of block 504.

The method 500 can include block 506 of defining one or more tests for each the one or more components containing one or more of the identified data couples. The one or more tests may use dynamic analysis to identify data couple variable use coverage in the source file 216. As referred to herein, dynamic analysis refers to the integration of static analysis, described above, and code coverage. For example, the requirements information file 214 may include the following requirements, illustrated in Table 1, for a "run speed command" (RSC) module of a source file 216:

TABLE 1

| | Requirements for run_speed_command (RSC) module |
|---|---|
| REQ_RSC_001 | The module shall retrieve and calculate the speed when instructed with CALCULATE_CMD |
| REQ_RSC_002 | The module shall display the speed to the console when instructed with DISPLAY_CMD |
| REQ_RSC_003 | The module shall do nothing when instructed with other commands |

A user may define three tests for the requirements of the RSC module as illustrated below in Table 2:

TABLE 2

| | Tests for run_speed_command (RSC) module | Requirement Ref. |
|---|---|---|
| TC_RSC_001 | Expect that speed is set to a non zero VALUE when command is CALCULATE_CMD | REQ_RSC_001 |
| TC_RSC_002 | Expect that Speed:VALUE is displayed when command is DISPLAY_CMD | REQ_RSC_002 |
| TC_RSC_003 | Expect that nothing is displayed in the cockpit console on other inputs (not CALCULATE_CMD, DISPLAY_CMD) | REQ_RSC_003 |

Figure 6:
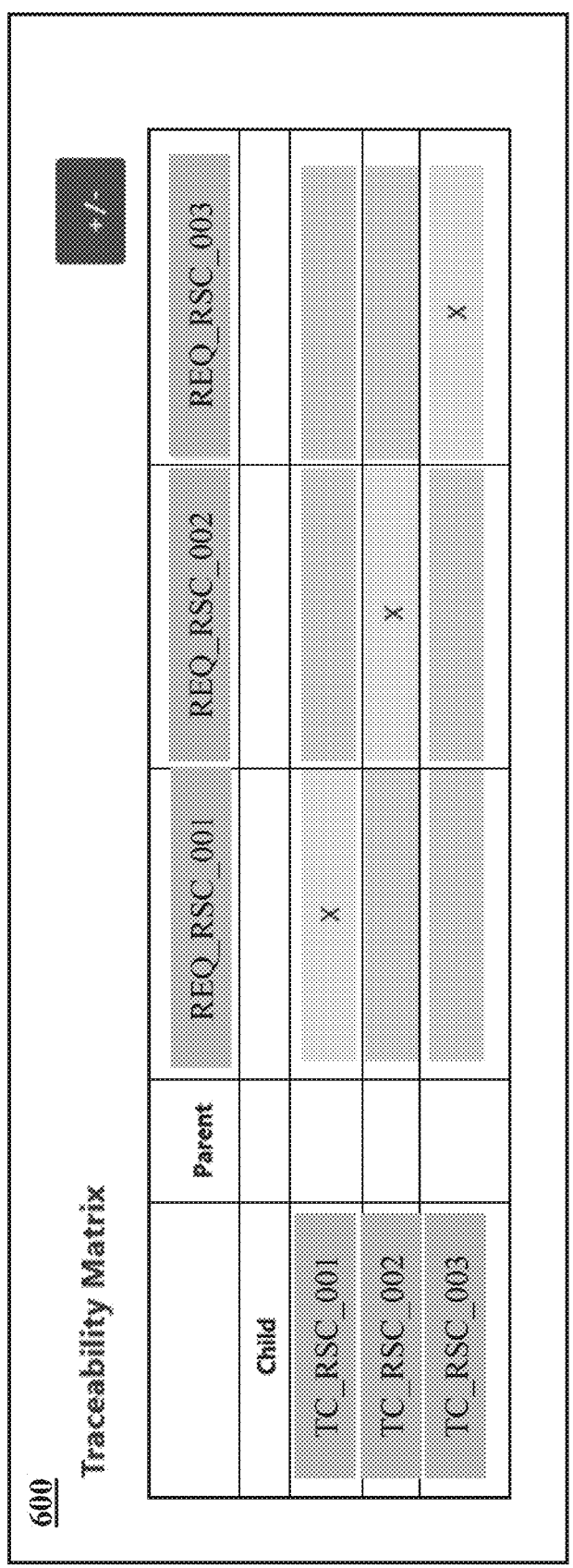
FIG. 6 is a block diagram illustrating an example requirements traceability matrix in accordance with exemplary embodiments.

In an exemplary embodiment, the dynamic analysis module 254 can be configured to execute the method of block 506. Traceability of each of the defined tests to the requirements of the requirements information file 214 may be visualized by generating a traceability matrix 600 as illustrated in FIG. 6. The traceability matrix 600 is generated based on the requirements and tests of Tables 1 and 2. The traceability matrix 600 illustrates which of the one or more tests is used for each of the one or more requirements. In an exemplary embodiment, the traceability matrix generation module 260 can be configured to generate the traceability matrix 600.

The method 500 can include block 508 of executing the one or more tests on the source file 216. Each of the one or more tests may be individually executable. In an exemplary embodiment, the dynamic analysis module 254 can be configured to execute the method of block 508.

The method 500 can include block 510 of identifying data couple variable use coverage of the source file 216 based on the dynamic analysis. In an exemplary embodiment, the dynamic analysis module 254 can be configured to execute the method of block 510.

The method 500 can include block 512 of generating a data coupling report (e.g., the report 234) based on the identified data couple variable use coverage. The data coupling report may be transmitted to and displayed to the user via the display 210 and/or the graphical user interface 232 on the user device 230. In an exemplary embodiment, the report generation module 256 can be configured to execute the method of block 512.

Figure 7A:
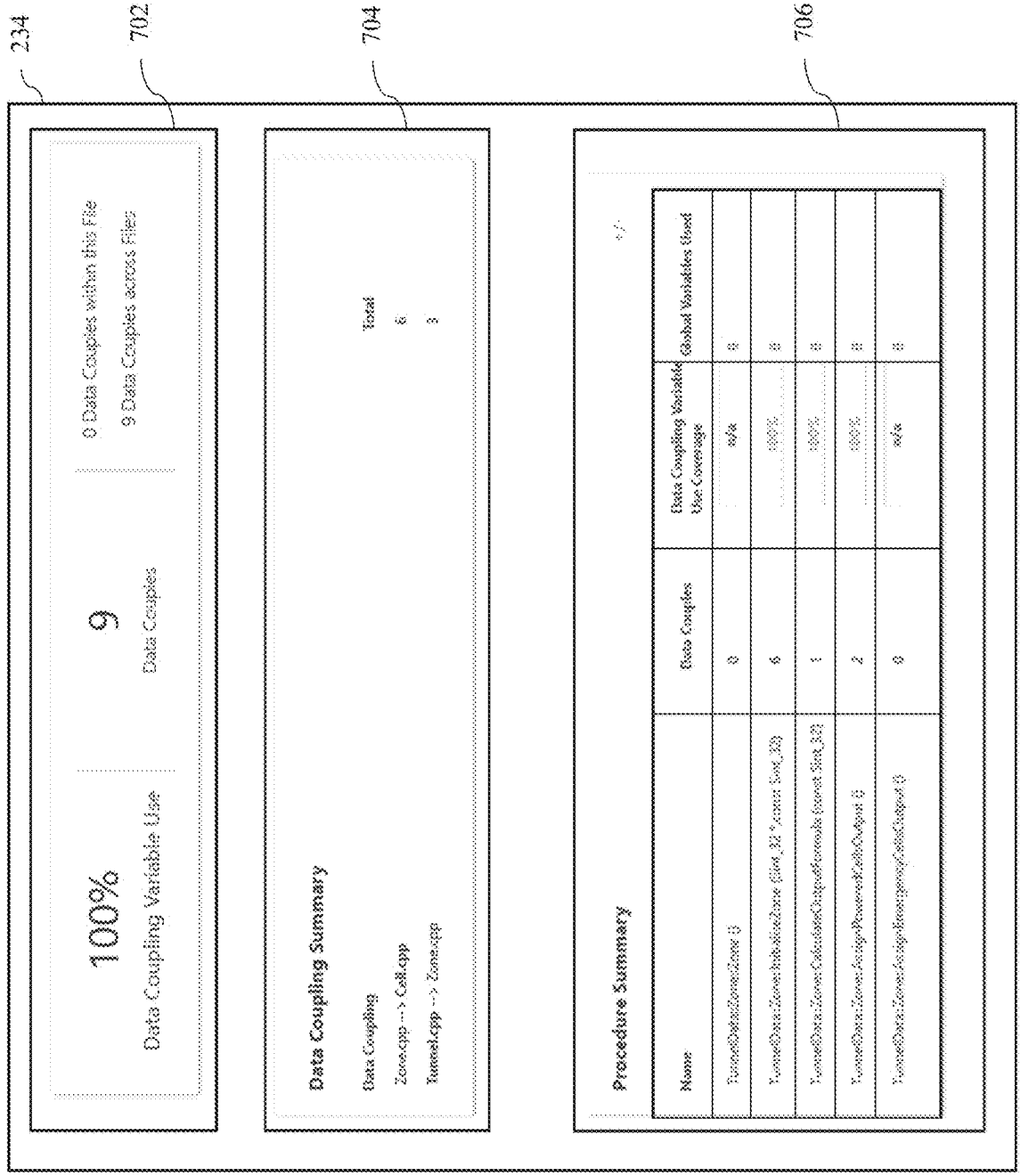
FIGS. 7a-7c are block diagrams illustrating an example data coupling report in accordance with exemplary embodiments.
Figure 7B:
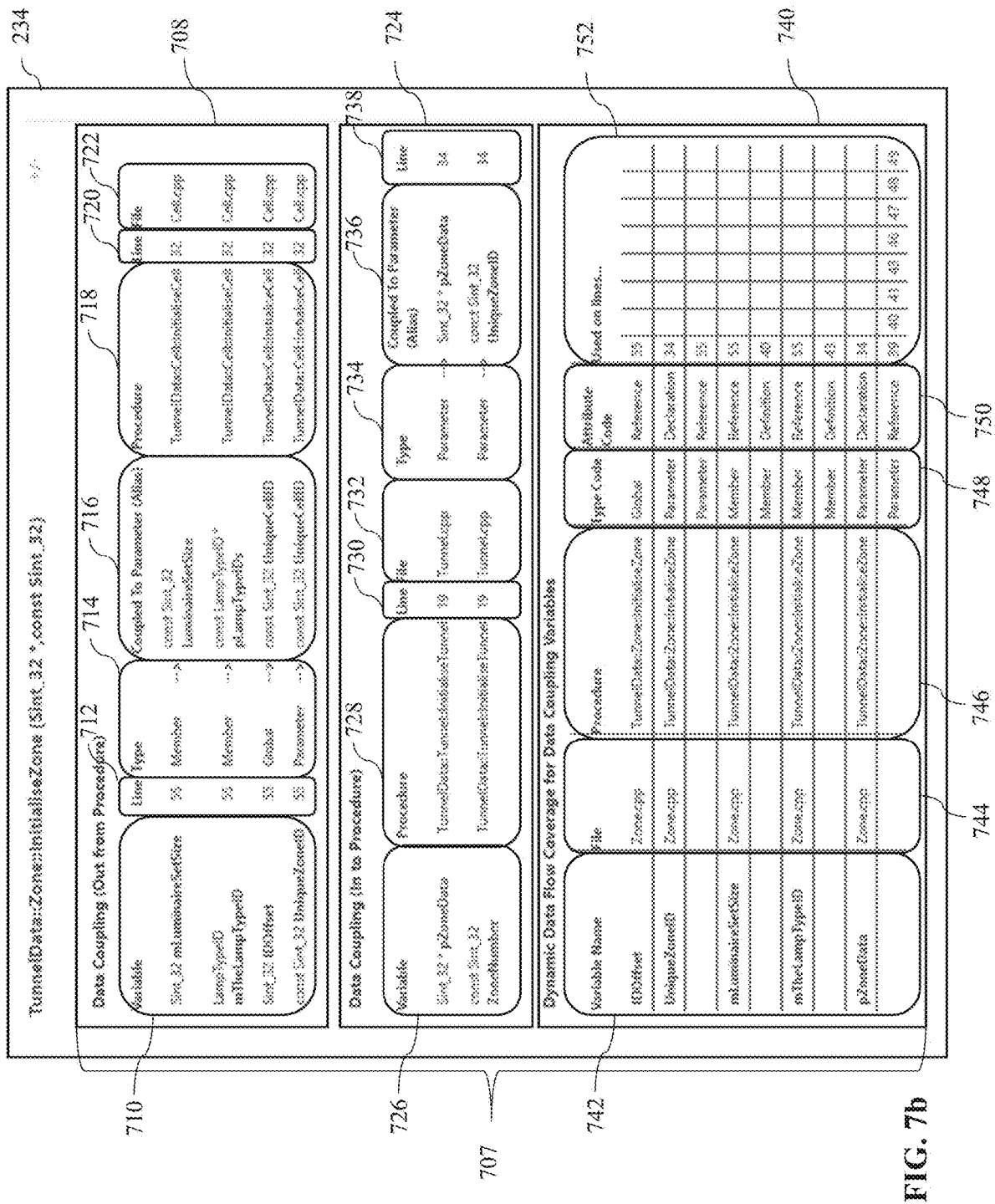
Figure 7C:
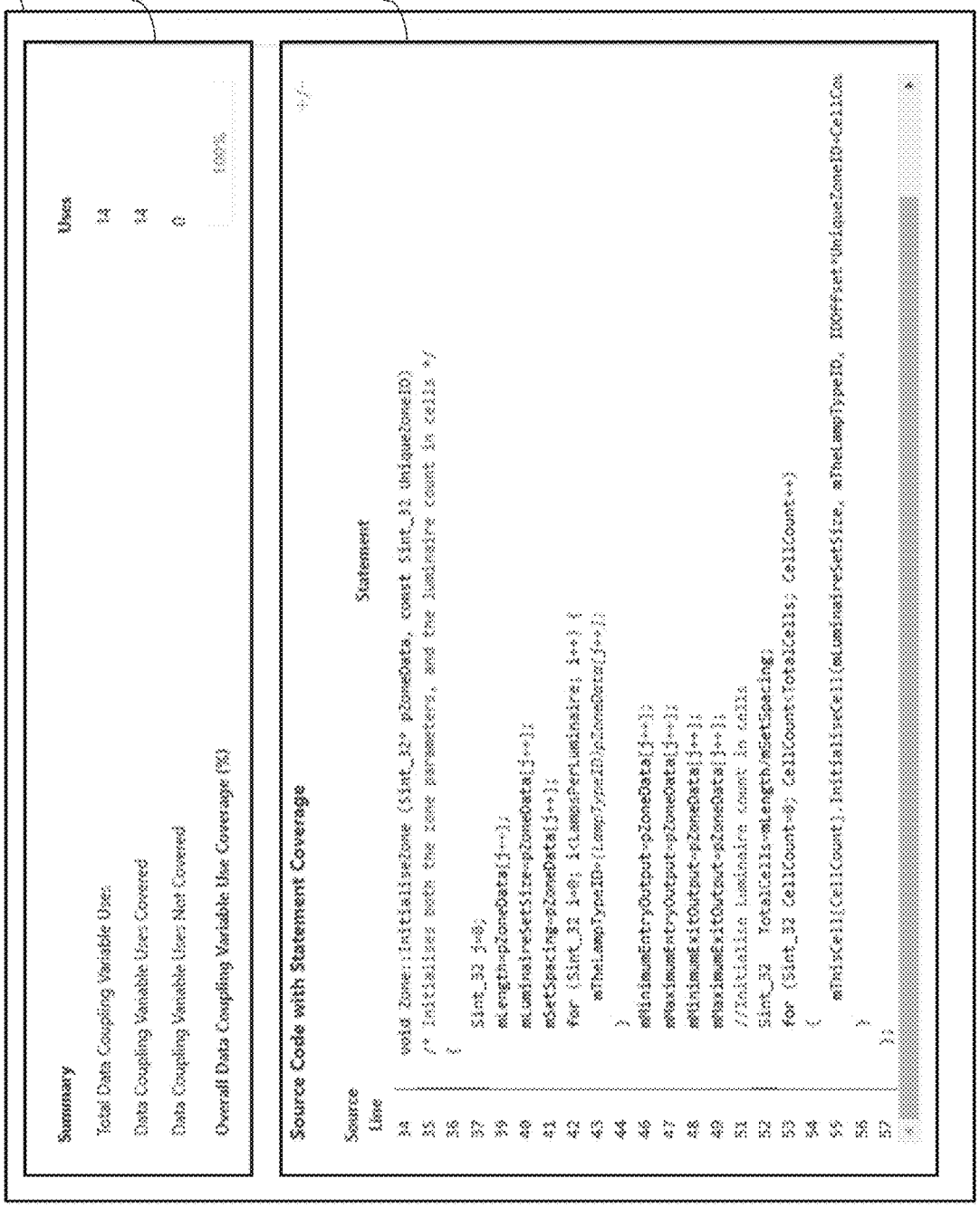

Referring to FIGS. 7a-7c The data coupling report (e.g., the report 234) includes a first section 702, a second section 704, a third section 706, a fourth section 707, a fifth section 754, and a sixth section 756. The first section 702 indicates the data coupling coverage and the total number of identified data couples within the source file 216. The data coupling coverage may be displayed as a data coupling variable use percentage between 0% and 100%. The second section 704 lists the components of the source file 216 linked by one or more of the identified one or more data couples and a number of data couples within the linked components. The third section 706 lists the data couple variable use coverage for the identified one or more data couples for each of one or more components and a number of global variables used within the source file 216. In an exemplary embodiment, the data couple variable use coverage based on the dynamic analysis. The fourth section 707 includes having a first table 708 indicating the data couples of the one or more identified data couples that originate from each of the one or more components of the source file 216 and a second table 724 indicating the data couples of the one or more identified data couples where the destination of the data couple is one of the one or more components of the source file 216. The data coupling report may include a fourth section 707 for each of the one or more components. The first table 708 includes a first column 710, a second column 712, a third column 714, a fourth column 716, a fifth column 718, a sixth column 720, and a seventh column 722. The first column 710 identifies the variable of one of the identified one or more data couples. The second column 712 indicates a software code line of the source file 216 where the variable is located. The third column 714 identifies a variable type of the variable. The fourth column 716 identifies a parameter of the one or more components coupled to the variable. The fifth column 718 identifies the components containing the identified parameter. The sixth column 720 identifies a source code line containing the location of the parameter coupled to the variable. The seventh column 722 identifies a component of the source file 216 containing the component. The second table 724 includes a first column 726, a second column 728, a third column 730, a fourth column 732, a fifth column 734, a sixth column 736, and a seventh column 738. The first column 726 identifies the variable of one of the identified one or more data couples. The second column 728 identifies a destination component of the variable. The third column 730 identifies a source code line of the source file 216 where the variable is called. The fourth column 732 identifies a component of the source file 216 containing the component calling the variable. The fifth column 734 identifies a variable type of the variable. The sixth column 736 identifies a parameter of the one or more components coupled to the variable. The seventh column 738 identifies a source code line where the parameter is located. The fourth section 707 can also include a data coupling variable use coverage section 740 that illustrates the data of the source file 216 which is shared between components of interest of the source file 216, and coverage against this identified data. The data coupling variable use coverage section 740 includes a first column 742 identifying a variable of the source file 216, a second column 744 identifying the source file 216 containing the variable, a third column 746 identifying a component within the source file 216 containing the variable, a fourth column 748 identifying a variable type of the variable, a fifth column 750 identifying an attribute of the variable, and a sixth column 752 identifying the source code lines of the source code file 216 in which the variable is used. The data coupling report 234 can also include a fifth section 754 providing a high-level summary overview of the data coupling coverage of the source file 216. The data coupling report 234 can also include a sixth section 756 providing the source code of the source file 216 associated with the first table 708 and the second table 724.

Figure 8A:
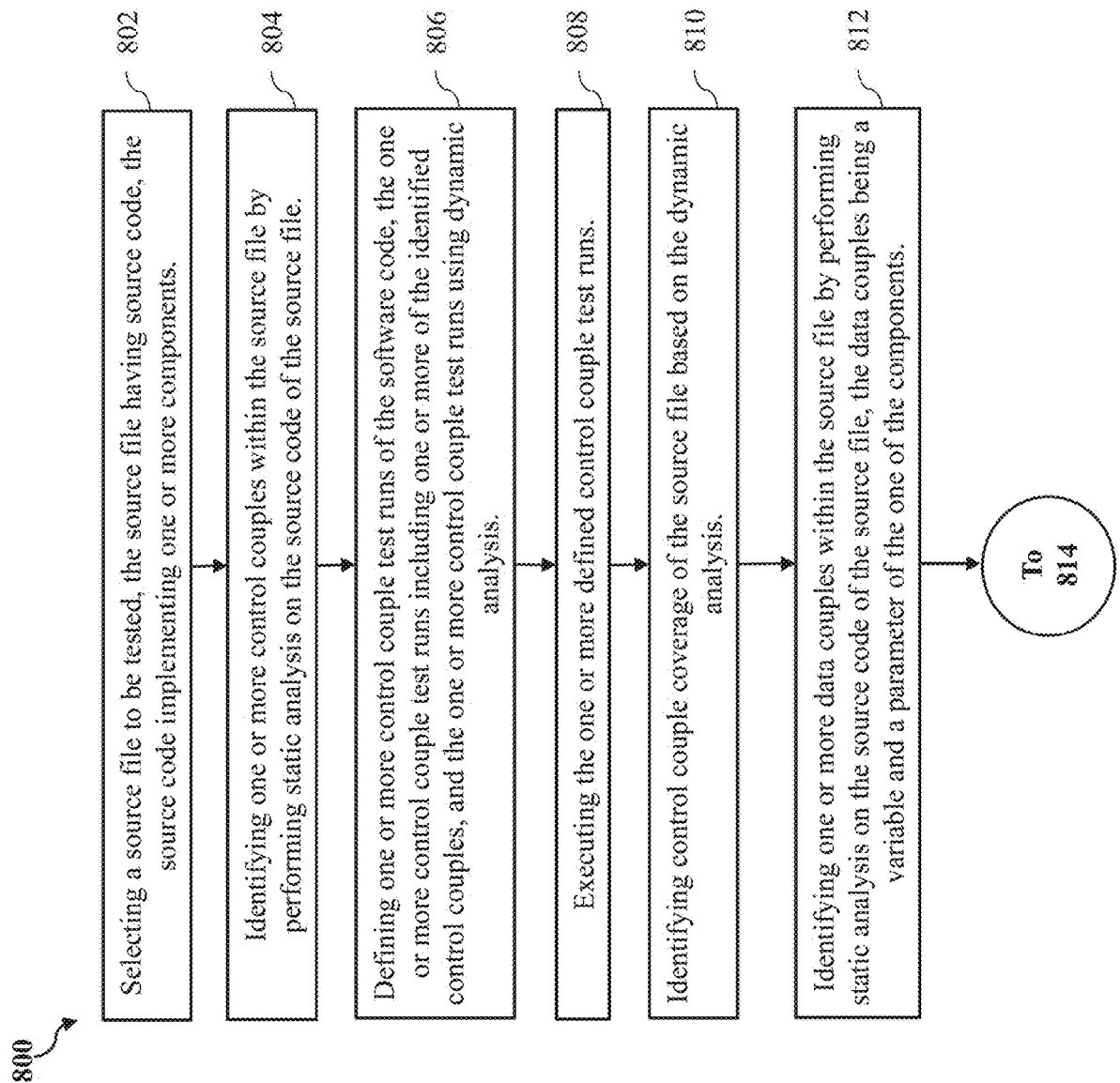
FIGS. 8a-8b is a flow chart illustrating an exemplary method for verifying control coupling and data coupling coverage in testing of software code in accordance with exemplary embodiments.
Figure 8B:
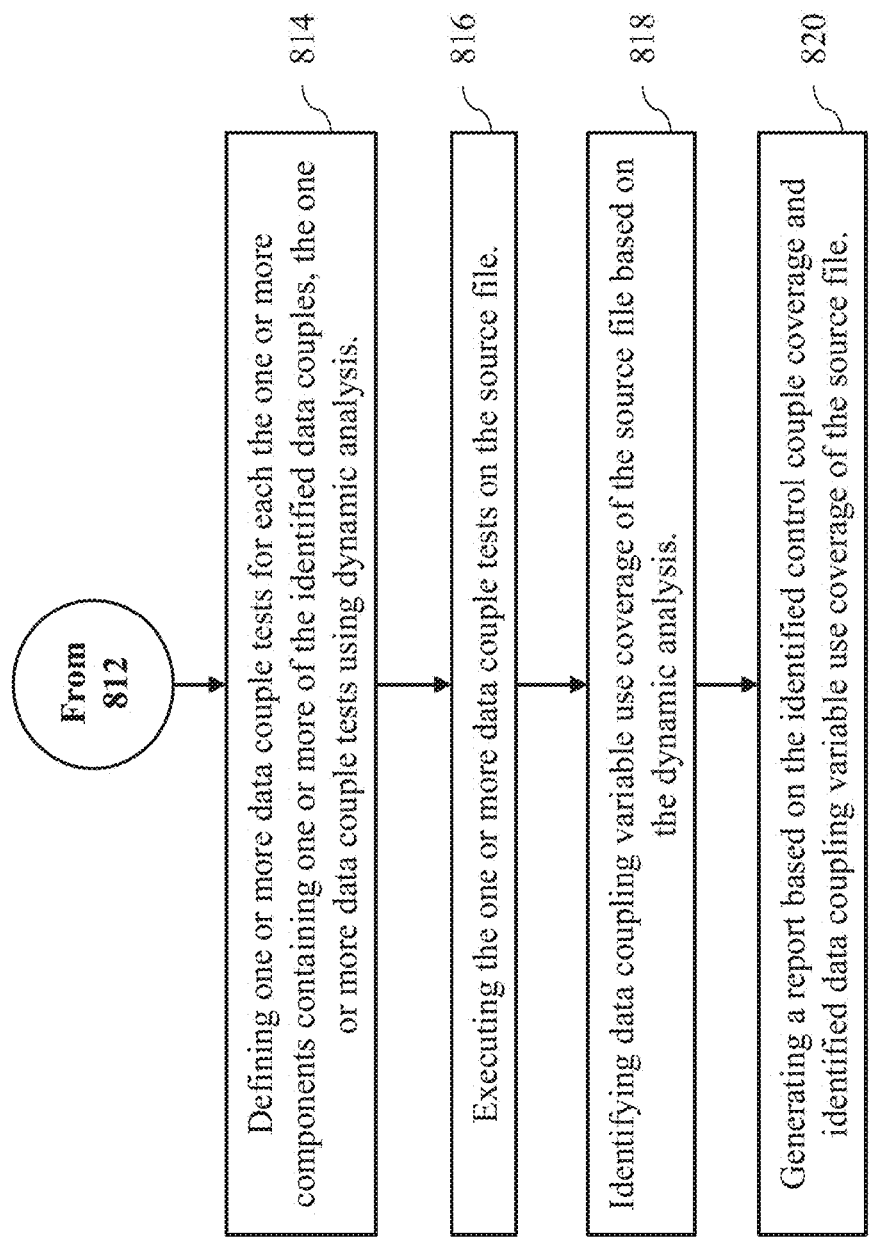

Exemplary Method for Verifying Control Coupling and Data Coupling Analysis in Testing of Software Code FIG. 8a-8b illustrates a method 800 for verifying control coupling and data coupling analysis in testing of software code in accordance with exemplary embodiments. The method 800 produces a report 234 that combines the control coupling report of the method 300 and the data coupling report of the method 500. Accordingly the block 802 corresponds to the blocks 302 and 502 of the methods 300 and 500; the blocks 804-810 correspond to the blocks 304-310 of the method 300 and the blocks 812-818 correspond to the blocks 504-510 of the method 500; and the block 820 corresponds to the blocks 312 and 512 of the methods 300 and 500.

Referring to block 820, the report generated by the method 800 includes all the sections of the control coupling report of the method 300 and the data coupling report of the method 500 as described with reference to FIGS. 4b-4c and 7a-7c.

The methods and systems provided for herein provide a qualifiable tool, i.e. the software requirements verification program 220, for use in the software testing. In particular, exemplary embodiments of the methods and systems provided for herein provide a qualifiable tool for use in the verification of control coupling and data coupling analysis in software code. The reports, e.g. the control coupling and data coupling reports 234, generated by the software requirements verification program 220 provide users with verifiable, deterministic, and predictable results of software testing. Thus, the methods and systems provided for herein ensure confidence in software testing at least equivalent to that of more resource heavy and time-consuming processes such as manual verification. The control coupling and data coupling reports of the present methods and systems prove the capabilities of a software requirements verification program 220 to properly perform its tasks once, thereby eliminating the need to verify the subsequent performance. The methods and systems provided for herein may implement the qualification software requirements verification program 220 using the methods and systems as disclosed in U.S. Pat. No. 8,949,770 "Automated Management of Software Requirements Verification," and in "LDRA Tool Qualification Packs," both of which are herein incorporated by reference in their entirety.

Computer System Architecture

Figure 9:
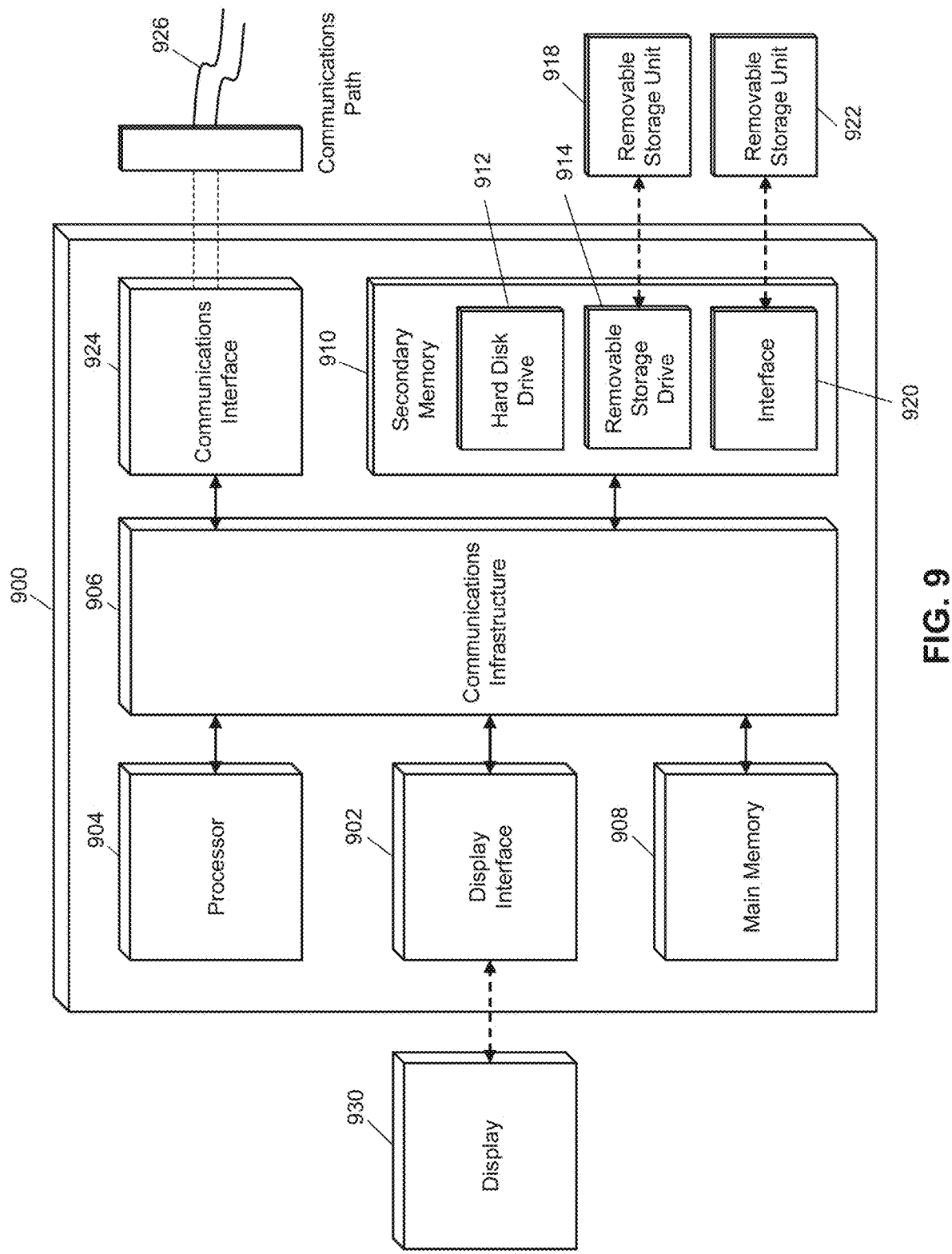
FIG. 9 is a block diagram illustrating a computer system architecture in accordance with exemplary embodiments.

FIG. 9 illustrates a computer system 900 in which embodiments of the present disclosure, or portions thereof, may be implemented as computer-readable code. For example, the requirements information source 202, the device 204, the user device 230 of FIG. 2a may be implemented in the computer system 900 using hardware, non-transitory computer readable media having instructions stored thereon, or a combination thereof and may be implemented in one or more computer systems or other processing systems. Hardware may embody modules and components used to implement the methods of FIGS. 3, 5, and 8a-8b.

If programmable logic is used, such logic may execute on a commercially available processing platform configured by executable software code to become a specific purpose computer or a special purpose device (e.g., programmable logic array, application-specific integrated circuit, etc.). A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments.

A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 918, a removable storage unit 922, and a hard disk installed in hard disk drive 912.

Various embodiments of the present disclosure are described in terms of this example computer system 900. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 904 may be a special purpose or a general purpose processor device specifically configured to perform the functions discussed herein. The processor device 904 may be connected to a communications infrastructure 906, such as a bus, message queue, network, multi-core message-passing scheme, etc. The network may be any network suitable for performing the functions as disclosed herein and may include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art. The computer system 900 may also include a main memory 908 (e.g., random access memory, read-only memory, etc.), and may also include a secondary memory 910. The secondary memory 910 may include the hard disk drive 912 and a removable storage drive 914, such as a floppy disk drive, a magnetic tape drive, an optical disk drive, a flash memory, etc.

The removable storage drive 914 may read from and/or write to the removable storage unit 918 in a well-known manner. The removable storage unit 918 may include a removable storage media that may be read by and written to by the removable storage drive 914. For example, if the removable storage drive 914 is a floppy disk drive or universal serial bus port, the removable storage unit 918 may be a floppy disk or portable flash drive, respectively. In one embodiment, the removable storage unit 918 may be non-transitory computer readable recording media.

In some embodiments, the secondary memory 910 may include alternative means for allowing computer programs or other instructions to be loaded into the computer system 500, for example, the removable storage unit 922 and an interface 920. Examples of such means may include a program cartridge and cartridge interface (e.g., as found in video game systems), a removable memory chip (e.g., EEPROM, PROM, etc.) and associated socket, and other removable storage units 922 and interfaces 920 as will be apparent to persons having skill in the relevant art.

Data stored in the computer system 900 (e.g., in the main memory 908 and/or the secondary memory 910) may be stored on any type of suitable computer readable media, such as optical storage (e.g., a compact disc, digital versatile disc, Blu-ray disc, etc.) or magnetic tape storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 900 may also include a communications interface 924. The communications interface 924 may be configured to allow software and data to be transferred between the computer system 900 and external devices. Exemplary communications interfaces 924 may include a modem, a network interface (e.g., an Ethernet card), a communications port, a PCMCIA slot and card, etc. Software and data transferred via the communications interface 924 may be in the form of signals, which may be electronic, electromagnetic, optical, or other signals as will be apparent to persons having skill in the relevant art. The signals may travel via a communications path 926, which may be configured to carry the signals and may be implemented using wire, cable, fiber optics, a phone line, a cellular phone link, a radio frequency link, etc.

The computer system 900 may further include a display interface 902. The display interface 902 may be configured to allow data to be transferred between the computer system 900 and external display 930. Exemplary display interfaces 902 may include high-definition multimedia interface (HDMI), digital visual interface (DVI), video graphics array (VGA), etc. The display 930 may be any suitable type of display for displaying data transmitted via the display interface 902 of the computer system 900, including a cathode ray tube (CRT) display, liquid crystal display (LCD), light-emitting diode (LED) display, capacitive touch display, thin-film transistor (TFT) display, etc.

Computer program medium and computer usable medium may refer to memories, such as the main memory 908 and secondary memory 910, which may be memory semiconductors (e.g., DRAMs, etc.). These computer program products may be means for providing software to the computer system 900. Computer programs (e.g., computer control logic) may be stored in the main memory 908 and/or the secondary memory 910. Computer programs may also be received via the communications interface 924. Such computer programs, when executed, may enable computer system 900 to implement the present methods as discussed herein. In particular, the computer programs, when executed, may enable processor device 904 to implement the methods illustrated by FIGS. 3, 5, and 8*a*-8*b*, as discussed herein. Accordingly, such computer programs may represent controllers of the computer system 900. Where the present disclosure is implemented using software, the software may be stored in a computer program product and loaded into the computer system 500 using the removable storage drive 914, interface 920, and hard disk drive 912, or communications interface 924.

The processor device 904 may comprise one or more modules or engines configured to perform the functions of the computer system 900. Each of the modules or engines may be implemented using hardware and, in some instances, may also utilize software, such as corresponding to program code and/or programs stored in the main memory 908 or secondary memory 910. In such instances, program code may be compiled by the processor device 904 (e.g., by a compiling module or engine) prior to execution by the hardware of the computer system 900. For example, the program code may be source code written in a programming language that is translated into a lower level language, such as assembly language or machine code, for execution by the processor device 904 and/or any additional hardware components of the computer system 900. The process of compiling may include the use of lexical analysis, preprocessing, parsing, semantic analysis, syntax-directed translation, code generation, code optimization, and any other techniques that may be suitable for translation of program code into a lower level language suitable for controlling the computer system 900 to perform the functions disclosed herein. It will be apparent to persons having skill in the relevant art that such processes result in the computer system 900 being a specially configured computer system 900 uniquely programmed to perform the functions discussed above.

Techniques consistent with the present disclosure provide, among other features, systems and methods for verifying control coupling and/or data coupling analysis in testing of software code. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method for verifying control coupling analysis in testing of software code, the method comprising:
   selecting a source file to be tested, the source file having source code;
   identifying one or more control couples within the source file by performing static analysis on the source code of the source file;
   defining one or more test runs of the software code, the one or more test runs including one or more of the identified control couples, and the one or more test runs using dynamic analysis;
   executing the one or more defined test runs;
   identifying control coupling coverage of the source file based on the dynamic analysis; and
   generating a control coupling report based on the identified control coupling coverage of the source file.

2. The method of claim 1, wherein the one or more test runs include less than all the identified control couples within the source file.

3. The method of claim 1, wherein the control coupling report includes a first section indicating the control coupling coverage of the source file as a percentage between 0% and 100% and the total number of identified control couples.

4. The method of claim 1, wherein the control coupling report includes a second section listing the identified one or more control couples, the destination location of the identified one or more control couples from the source file, and a control coupling coverage based on the dynamic analysis for each identified one or more control couples.

5. The method of claim 1, wherein the control coupling report includes a third section listing the control coupling coverage for the identified one or more control couples for each of one or more components within the source file, the control coupling coverage based on the dynamic analysis.

6. The method of claim 5, wherein the control coupling report includes a fourth section having a first table indicating the control couples of the one or more identified control couples that originate from each of the one or more components of the source file and a second table indicating the control couples of the one or more identified control couples where the destination of the control couple is one of the one or more components of the source file.

7. The method of claim 6, wherein the fourth section is repeated for each of the one or more components of the source file.

8. The method of claim 6, wherein the first table and the second table include a first column identifying a call-from point between the one or more identified control couples, a second column identifying a call-to point between the one or more identified control couples, a third column indicating a destination source file the call-to or call-from is to, a fourth column indicating a software code line of the source file where each of the one or more identified control couples are located, and a fifth column indicating a control coverage of the one or more identified control couples based on the dynamic analysis.

9. The method of claim 8, wherein the fourth section includes source code of the source file associated with the first table and the second table.

10. The method of claim of claim 1, including:
    generating a file call diagram for the source file, the call diagram illustrating local calls between one or more components of the source file.

11. The method of claim 1, wherein the source file is a system set including a plurality of source files from one or more nodes in a system, including:
    generating system call diagram for the plurality of source files, the system call diagram illustrating local calls between one or more components within the plurality of source files and inter source file component calls between the plurality of source files of the system set to which each of the plurality of source files of the system set has a control couple.

12. The method of claim 11, including:
    selecting a components of the one or more components within the plurality of source files; and
    generating a diagram, the diagram displaying the one or more nodes of the system involved in control coupling for the selected component.

13. A system for verifying control coupling analysis in testing of software code, the system comprising:
one or more processors, one or more computer-readable memories, one or more computer-readable tangible storage devices, and instructions stored on at least one of the one or more storage devices for execution by at least one of the one or more processors via at least one of the one or more memories, the instructions comprising:
selecting a source file to be tested, the source file having source code;
identifying one or more control couples within the source file by performing static analysis on the source code of the source file;
defining one or more test runs of the software code, the one or more test runs including one or more of the identified control couples, and the one or more test runs using dynamic analysis;
executing the one or more defined test runs;
identifying control coupling coverage of the source file based on the dynamic analysis; and
generating a control coupling report based on the identified control coupling coverage of the source file.

14. The system of claim 13, wherein the one or more test runs include less than all the identified control couples within the source file.

15. The system of claim 13, wherein the control coupling report includes a first section indicating the control coupling coverage of the source file as a percentage between 0% and 100% and the total number of identified control couples.

16. The system of claim 13, wherein the control coupling report includes a second section listing the identified one or more control couples, the destination location of the identified one or more control couples from the source file, and a control couple coverage based on the dynamic analysis for each identified one or more control couples.

17. The system of claim 13, wherein the control coupling report includes a third section listing the control couple coverage for the identified one or more control couples for each of one or more components within the source file, the control couple coverage based on the dynamic analysis.

18. The system of claim 17, wherein the control coupling report includes a fourth section having a first table indicating the control couples of the one or more identified control couples that originate from each of the one or more components of the source file and a second table indicating the control couples of the one or more identified control couples where the destination of the control couple is one of the one or more components of the source file.

19. The system of claim 18, wherein the fourth section is repeated for each of the one or more defined test runs.

20. The system of claim 18, wherein the first table and the second table include a first column identifying a call-from point between the one or more identified control couples, a second column identifying a call-to point between the one or more identified control couples, a third column indicating a destination source file the call-to or call-from is to, a fourth column indicating a software code line of the source file where each of the one or more identified control couples are located, and a fifth column indicating a control coverage of the one or more identified control couples based on the dynamic analysis.

21. The system of claim 18, wherein the fourth section includes source code of the source file associated with the first table and the second table.

22. The system of claim of claim 13, including instructions for:
generating a file call diagram for the source file, the call diagram illustrating local calls between one or more components of the source file.

23. The system of claim 13, wherein the source file is a system set including a plurality of source files from one or more nodes in a system, including instructions for:
generating system call diagram for the plurality of source files, the system call diagram illustrating local calls between one or more components within the plurality of source files and inter source file component calls between the plurality of source files of the system set to which each of the plurality of source files of the system set has a control couple.

24. The system of claim 23, including instructions for:
selecting a component of the one or more components within the plurality of source files; and
generating a diagram, the diagram displaying the one or more nodes of the system involved in control coupling for the selected component.

* * * * *